(12) United States Patent
Chen et al.

(10) Patent No.: US 8,525,474 B2
(45) Date of Patent: Sep. 3, 2013

(54) CHARGE/START SYSTEM AND ELECTRIC VEHICLE APPLYING THE SAME

(75) Inventors: Tshaw-Chuang Chen, Xinfeng Township, Hsinchu County (TW); Min-Chuan Wu, Hsinchu (TW); Wen-Shu Chiang, Zhudong Township, Hsinchu County (TW); Shao-Yu Li, Zhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 405 days.

(21) Appl. No.: 12/824,450

(22) Filed: Jun. 28, 2010

(65) Prior Publication Data
US 2011/0127957 A1 Jun. 2, 2011

(30) Foreign Application Priority Data
Dec. 2, 2009 (TW) ................................ 98141264 A (51) Int. Cl.
*H02J 7/00* (2006.01)
(52) U.S. Cl.
USPC .......... 320/109; 320/104; 320/112; 180/65.1; 180/65.21; 340/636.1; 324/426
(58) Field of Classification Search
USPC ....................................................... 320/109
See application file for complete search history.

(56) References Cited

U.S. PATENT DOCUMENTS

| 4,682,097 A * | 7/1987 | Matsui .......................... 320/123 |
| 4,937,528 A * | 6/1990 | Palanisamy ................... 324/430 |
| 5,341,077 A * | 8/1994 | Chen et al. .................... 318/434 |
| 6,211,681 B1 * | 4/2001 | Kagawa et al. ............... 324/426 |
| 6,326,765 B1 | 12/2001 | Hughes et al. |
| 6,362,599 B1 * | 3/2002 | Turner et al. .................. 320/135 |
| 6,424,157 B1 * | 7/2002 | Gollomp et al. .............. 324/430 |
| 6,633,165 B2 * | 10/2003 | Bertness ........................ 324/426 |
| 6,690,140 B2 * | 2/2004 | Larson ........................... 320/104 |

(Continued)

FOREIGN PATENT DOCUMENTS

| CN | 2696895 | 5/2005 |
| CN | 101218119 | 7/2008 |

(Continued)

OTHER PUBLICATIONS

Chinese language office action dated Apr. 5, 2012.

(Continued)

*Primary Examiner* — Yalkew Fantu
(74) *Attorney, Agent, or Firm* — McClure, Qualey & Rodack, LLP (57) ABSTRACT

A charge-or-start system applied in an electric vehicle is provided. The charge-or-start system includes a charge-or-start device coupled to an external power source, an on-car electric source coupled to the charge-or-start device and a battery unit coupled to the charge-or-start device for storing and providing power. In charge mode, under control of the charge-or-start device, anyone of the external power source and the on-car electric source provides power to the battery unit for charging the battery unit through the charge-or-start device. In starting mode, under control of the charge-or-start device, the battery unit provides power to the on-car electric source for activating the on-car electric source through the charge-or-start device.

18 Claims, 6 Drawing Sheets

(56) References Cited

U.S. PATENT DOCUMENTS

| | | |
|---|---|---|
| 6,889,126 B2 | 5/2005 | Komiyama et al. |
| 7,267,191 B2 * | 9/2007 | Xu et al. .................. 180/65.245 |
| 7,520,353 B2 | 4/2009 | Severinsky et al. |
| 2007/0012492 A1 * | 1/2007 | Deng et al. ................... 180/65.1 |
| 2009/0242288 A1 | 10/2009 | Oyobe et al. |

FOREIGN PATENT DOCUMENTS

| | | |
|---|---|---|
| JP | 2001275205 A | 10/2001 |
| JP | 2009095157 A | 4/2009 |
| TW | 470713 B | 1/2002 |
| WO | WO 2006/121761 | 11/2006 |

OTHER PUBLICATIONS

English language translation of abstract of CN 2696895 (published May 4, 2005).

English language translation of abstract of CN 101218119 (published Jul. 9, 2008).

English Abstract translation of JP2009095157 (Published Apr. 30, 2009).

English Abstract translation of JP2001275205 (Published Oct. 5, 2001).

English Abstract translation of TW470713 (Published Jan. 1, 2002).

* cited by examiner

CHARGE/START SYSTEM AND ELECTRIC VEHICLE APPLYING THE SAME

This application claims the benefit of Taiwan application Serial No. 98141264, filed Dec. 2, 2009, the subject matter of which is incorporated herein by reference.

BACKGROUND

1. Technical Field

The disclosure relates in general to a charge-or-start system and an electric vehicle applying the same.

2. Background

Due to the growing awareness of environmental protection, electric vehicles have attracted more and more attention from vehicle manufacturers and consumers. One kind of electric vehicle is purely charged by an external power source (such as the utility power) through an on-board charger of the electric vehicle. The electric vehicle has the advantage of zero air pollution but is disadvantaged by a short travel distance due to the limited battery capacity.

One of the prior electric vehicles is disclosed in U.S. Pat. No. 6,326,765 entitled "Electric Scooter with On-Board Charging System". The prior art technology discloses a plug-in electric vehicle which charges its battery unit by an on-board charger and an on-car electric source (such as a fuel cell) and can further re-charge the battery unit with feedback of energy generated during braking. Let the prior on-car charging system be taken for example. External power source supplies power to the on-board charger for charging the battery unit. The on-car electric source also supplies power to a DC-DC converter for charging the battery unit. Then, the battery unit provides the drive power to the motor.

According to the prior technology, each of the external power source and the on-car electric source needs a respective independent circuit and a respective converter for connecting the external power source or the on-car electric source to the battery unit. That is, the prior technology needs two sets of independent circuit and two sets of converter. This is because in the prior art, the on-board charger has to be located between the external power source and the battery unit; and the DC-DC converter has to be located between the on-car electric source and the battery unit. Further, if the on-car electric source of the prior technology includes a start motor and an engine generator, then an extra set of independent circuit is required to activate the start motor of the on-car electric source.

Besides, other types of hybrid electric vehicles are already available in the market. In general, the hybrid electric vehicle is classified as serial-type and parallel-type. In the serial-type hybrid electric vehicle, the motor provides the vehicle with driving force and the electric power of the motor is provided by a battery or an engine. In the parallel-type hybrid electric vehicle, both the motor and the engine provide driving force to the driving wheel.

Another prior technology is disclosed in U.S. Pat. No. 6,889,126 entitled "Drive Force Control for Hybrid Electric Vehicle". Engine outputs a rotation torque; a first motor is connected to the engine (the first motor can generate power by the engine torque) and a second motor provides driving torque for driving the vehicle. A power storage device connects the first motor and the second motor. Under control of a controller, the power storage device provides power to the second motor, and provides residual electric power to the first motor for speeding the engine. The first motor is a generator/motor. However, the prior technology does not utilize the external power source to charge the power storage device.

Recently, a plug-in hybrid electric vehicle (PHEV) is developed. The plug-in hybrid electric vehicle has an on-board charger and a start/generator. Control of the on-board charger and the start/generator needs respective independent control circuits. The prior technology does not integrate controllers of the on-board charger and the start/generator into an integrated charge-or-start system. That is, the prior technology cannot integrate controllers of the on-board charger and the start/generator into one integrated device.

SUMMARY

Consistent with the exemplary embodiments of the disclosure, there is provided a charge-or-start system and an electric vehicle applying the same. Integrated charge-or-start device of the charge-or-start system receives power outputted from one of an external power source and an on-car electric source and then outputs power to an internal battery unit for charging the battery unit. Besides, the integrated charge-or-start device can activate a start motor of an on-car electric source for driving engine which further drives an engine generator to generate power for charging the battery unit.

According to a first exemplary embodiment of the present disclosure, a charge-or-start system applied in an electric vehicle is provided. The charge-or-start system includes a charge-or-start device coupled to an external power source, an on-car electric source coupled to the charge-or-start device and a battery unit coupled to the charge-or-start device for storing and providing power. In charge mode, under control of the charge-or-start device, one of the external power source and the on-car electric source provides power to the battery unit for charging the battery unit through the charge-or-start device. In starting mode, under control of the charge-or-start device, the battery unit provides power to the on-car electric source for activating the on-car electric source through the charge-or-start device.

According to a second exemplary embodiment of the present disclosure, an electric vehicle including a charge-or-start system and a motor is provided. The charge-or-start system provides power to the motor. The charge-or-start system includes a charge-or-start device coupled to an external power source, an on-car electric source coupled to the charge-or-start device and a battery unit coupled to the charge-or-start device for storing and providing power. In charge mode, under control of the charge-or-start device, one of the external power source and the on-car electric source provides power to the battery unit for charging the battery unit through the charge-or-start device. In starting mode, under control of the charge-or-start device, the battery unit provides power to the on-car electric source for activating the on-car electric source through the charge-or-start device.

It is to be understood that both the foregoing general description and the following detailed description are exemplary and explanatory only and are not restrictive of the disclosed embodiments, as claimed.

DETAILED DESCRIPTION

In the embodiment of the disclosure, a charge-or-start device can receive power outputted from one of an external power source and an on-car electric source and further output power to a battery unit for charging the battery unit. Besides, the charge-or-start device can further activate a start motor of the on-car electric source so that the start motor drives an engine and the engine further drives an engine generator to generate power for charging the battery unit.

Figure 1:
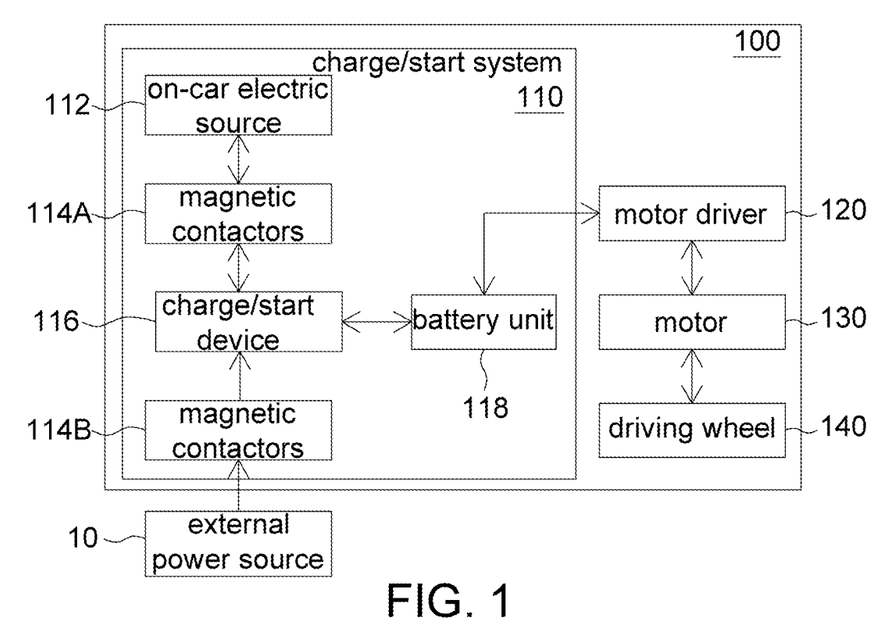
FIG. 1 is a schematic view of a system diagram of an electric vehicle according to an embodiment of the disclosure.

FIG. 1 is a schematic view of a system diagram of an electric vehicle according to an embodiment of the disclosure. As indicated in FIG. 1, the electric vehicle 100 at least includes a charge-or-start system 110, a motor driver 120, a motor 130 and a driving wheel 140. Functions and operations of the motor driver 120, the motor 130 and the driving wheel 140 are not restricted and the detailed descriptions thereof are omitted here.

The charge-or-start system 110 includes an on-car electric source 112, magnetic contactors 114A and 114B, a charge-or-start device 116 and a battery unit 118. Through the charge-or-start system 110, the battery unit 118 can be charged by (1) an external power source 10 (such as a single-phase AC utility power), (2) the on-car electric source 112 having a fuel cell or (3) the on-car electric source 112 capable of outputting three-phase AC power.

Figure 2:
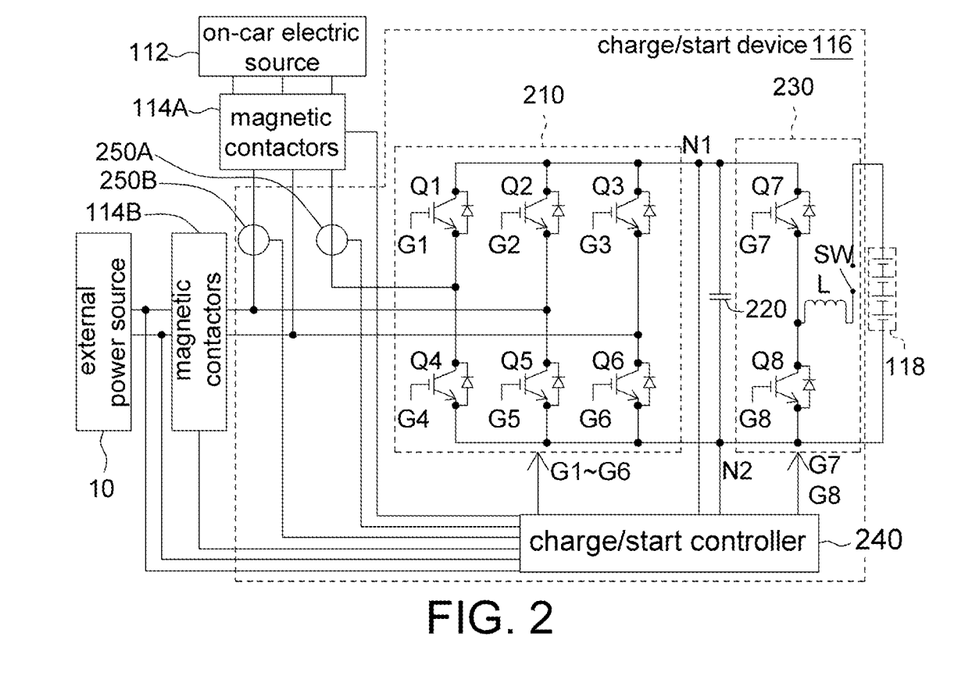
FIG. 2 is a schematic view of a functional diagram of a charge-or-start device according to the embodiment of the disclosure.

Referring to FIG. 2, a functional diagram of the charge-or-start device 116 according to the embodiment of the disclosure is shown. As indicated in FIG. 2, the charge-or-start device 116 includes an insulated gate bipolar transistor (IGBT) module 210, a filter 220, a bi-direction DC-DC converter 230, a charge-or-start controller 240, and current sensors 250A and 250B. The current sensors 250A and 250B sense current flowing between the IGBT module 210 and the magnetic contactor 114A.

The IGBT module 210 receives power from the external power source 10 or from the on-car electric source 112. The IGBT module 210 includes IGBTs Q1~Q6 each including a transistor and a free-wheeling diode. The IGBTs Q1~Q6 are controlled by gate signals G1~G6 outputted from the charge-or-start controller 240.

The filter 220, such as a capacitor, can filter the voltage outputted from the IGBT module 210. The bi-direction DC-DC converter 230 receives the voltage outputted from the IGBT module 210, converts the received voltage into a charge voltage and outputs the charge voltage to the battery unit 118. The bi-direction DC-DC converter 230 includes IGBTs Q7~Q8, an inductor L and a switch SW. The IGBTs Q7~Q8 are respectively controlled by gate signals G7~G8 outputted from the charge-or-start controller 240. The switch SW is controlled by the charge-or-start controller 240.

The charge-or-start controller 240 detects the voltage outputted from the IGBT module 210, senses the current and the voltage outputted from the bi-direction DC-DC converter 230 and further outputs the gate signals to the transistors inside the IGBT module 210. As indicated in FIG. 2, the gate signals G1~G6 outputted from the charge-or-start controller 240 control the on/off state of IGBTs of the IGBT module 210. Likewise, the gate signals G7~G8 outputted from the charge-or-start controller 240 control the on/off state of IGBTs of the bi-direction DC-DC converter 230. Buck operation of the bi-direction DC-DC converter 230 can be controlled through appropriate control on the on/off state of the IGBTs Q7 and Q8.

The power for the charge-or-start controller 240 can be provided by the external power source 10 or a 12V battery of the electric vehicle 100. If the charge-or-start controller 240 detects that the voltage outputted from the battery unit 118 is insufficient, for example if the voltage is lower than a predetermined voltage, the charge-or-start controller 240 activates the charge mode. For example, the charge-or-start controller 240 detects voltages at the nodes N1 and N2 so as to determine whether the voltage outputted from the battery unit 118 is sufficient. If the battery unit 118 does not include a battery management system, then the charge-or-start controller 240 will directly perform charge control. If the battery unit 118 includes a battery management system, then the battery management system and the charge-or-start controller 240 perform charge control via a communication interface. The charge-or-start of the present embodiment of the disclosure is disclosed below.

Figure 3:
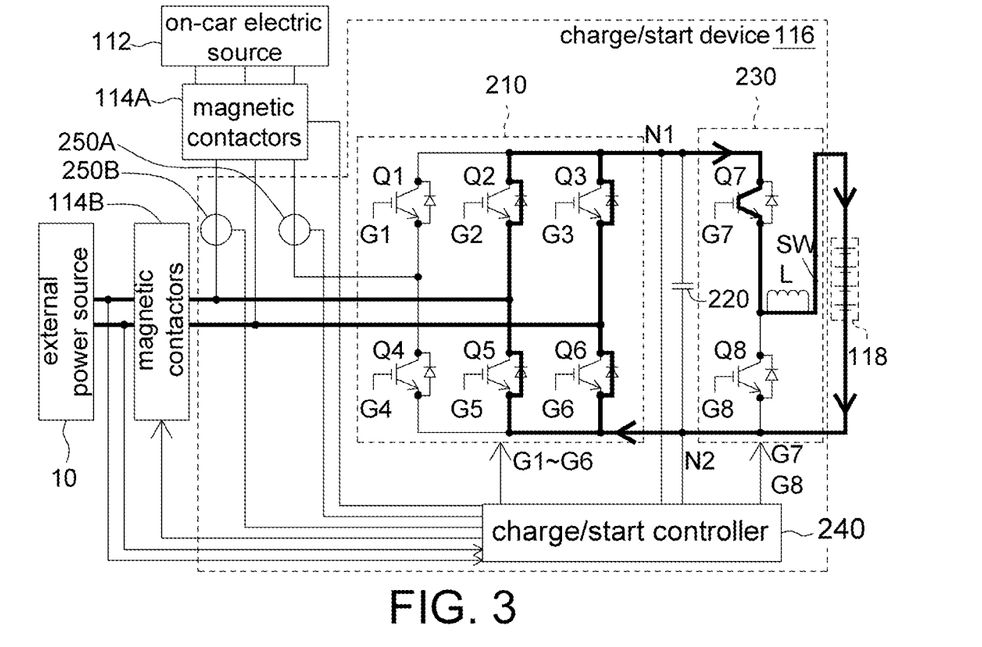
FIG. 3 is a schematic view of charging of a battery unit by an external power source (single-phase AC power)

Charge—by the External Power Source 10:

FIG. 3 is a schematic view of charging of the battery unit by the external power source 10 (outputting single-phase AC 110V utility power or single-phase AC 220V utility power) according to the embodiment of the disclosure.

As indicated in FIG. 3, the charge-or-start controller 240 performs charge control if the charge-or-start controller 240 detects that the electric vehicle 100 is already connected to the external power source 10. The charge-or-start controller 240 controls the magnetic contactor 114B to be turned on if the battery unit 118 is charged by the external power source 10. Meanwhile, the IGBT module 210 functions as a bridge rectifier for rectifying the single-phase AC power into DC power. If the voltage of the external power source 10 is higher than that of the battery unit 118, then the bi-direction DC-DC converter 230 performs buck operation (i.e. as a buck converter).

In FIG. 3, the current flows in the following directions: the external power source 10→the magnetic contactor 114B→the IGBT module 210→the IGBT Q7 (particularly, the transistor of the IGBT Q7)→the inductor L→the switch SW→the battery unit 118→the IGBT module 210→the magnetic contactor 114B→the external power source 10. In the present example, the IGBT module 210 is used as a bridge rectifier. For convenience of description, the current flow between the external power source 10 and the battery unit 118 is referred as the first current flow.

Figure 4:
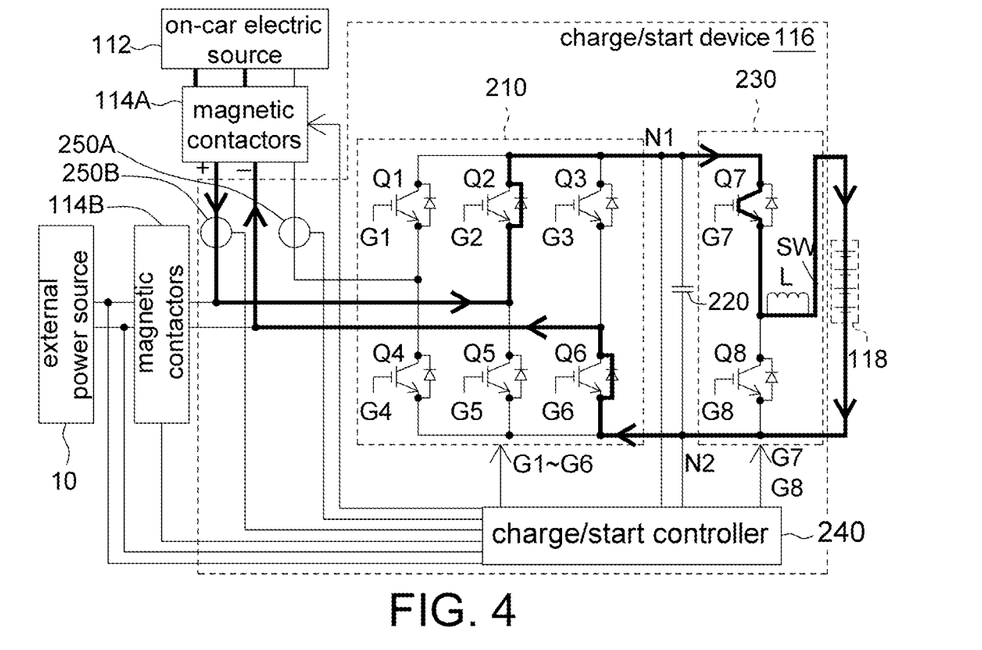
FIG. 4 is a schematic view of charging of a battery unit by an on-car electric source (including a fuel cell capable of outputting DC power)

Charge—by a Fuel Cell:

FIG. 4 is a schematic view of charging of the battery unit by the on-car electric source 112 (including a fuel cell capable of outputting DC power). As indicated in FIG. 4, if the on-car electric source 112 is a fuel cell capable of outputting DC power, then the fuel cell can charge the battery unit 118 through the charge-or-start device 116. Meanwhile, the magnetic contactor 114A is turned on.

In FIG. 4, the current flows in the following directions: the on-car electric source 112 (the fuel cell)→the magnetic contactor 114A→the IGBT Q2 (particularly, the free-wheeling diode of the IGBT Q2)→the IGBT Q7 (particularly, the transistor of the IGBT Q7)→the inductor L→the switch SW→the battery unit 118→the IGBT Q6 (particularly, the free-wheeling diode of the IGBT Q6)→the magnetic contactor 114A→the on-car electric source 112.

Figure 5:
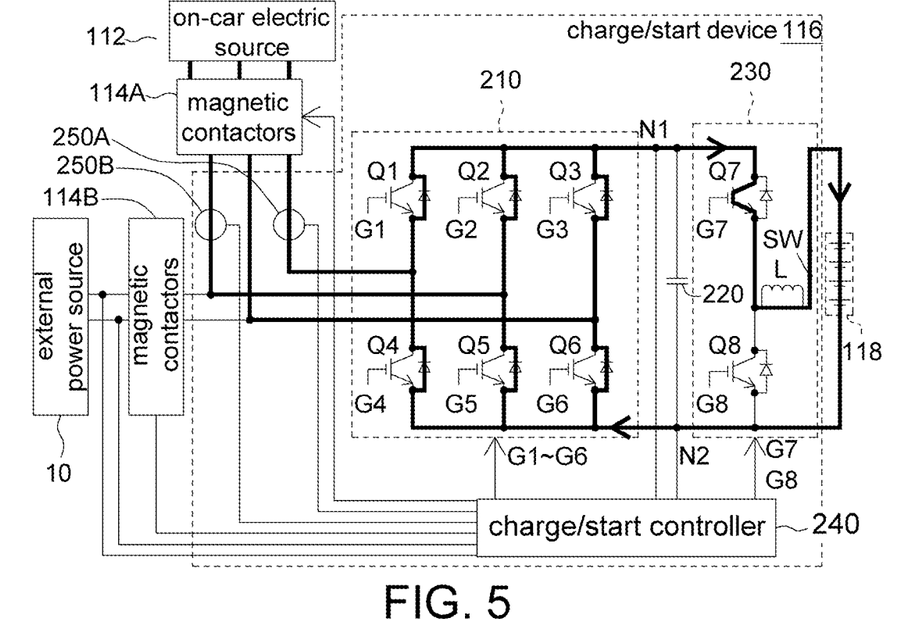
FIG. 5 is a schematic view of charging of a battery unit by an on-car electric source (including an engine generator capable of outputting three-phase AC power)

Charge—by the on-Car Electric Source 112 (Including an Engine Generator Capable of Outputting Three-Phase AC Power):

In the present example, the on-car electric source 112 includes a start motor and an engine generator capable of outputting three-phase AC power. After the start motor of the on-car electric source 112 is activated by the charge-or-start controller 240, the start motor drives an internal combustion engine (not illustrated) which further drives an engine generator of the on-car electric source 112 to generate power for charging the battery unit 118. Besides, the engine generator can be realized by a rotation engine generator or a linear engine generator.

FIG. 5 is a schematic view of charging of the battery unit by the on-car electric source 112 (including an engine generator capable of outputting three-phase AC power). As indicated in FIG. 5, after the start motor of the on-car electric source 112 is activated by the charge-or-start device 116, the start motor drives an internal combustion engine of the on-car electric source 112 which further drives the engine generator of the on-car electric source 112 to generate power for charging the battery unit 118 through the charge-or-start device 116. Under such circumstances, the magnetic contactor 114A is turned on and the IGBT module 210 can be used as a three-phase bridge rectifier for rectifying three-phase AC power into DC power.

In FIG. 5, the current flows in the following directions: the on-car electric source 112→the magnetic contactor 114A→the IGBT module 210→the IGBT Q7 (particularly, the transistor of the IGBT Q7)→the inductor L→the switch SW→the battery unit 118→the IGBT module 210→the magnetic contactor 114A→the on-car electric source 112.

Start Mode

In the present example, the on-car electric source 112 includes a start motor and an engine generator capable of outputting three-phase AC power. After the start motor of on-car electric source 112 is activated by the charge-or-start device 116, the start motor drives an internal combustion engine which further drives an engine generator of the on-car electric source 112 to generate power for charging the battery unit 118.

When the start motor of the on-car electric source 112 is activated by the charge-or-start device 116, the voltage outputted from the battery unit 118 is converted (bucked/boosted) by the bi-direction DC-DC converter 230 and filtered by the filter 220 and then is inputted to an IGBT module 210. The voltage outputted from the IGBT module 210 flows through the magnetic contactor 114A. The charge-or-start controller 240 controls the magnetic contactor 114A to be turned on when the start motor of the on-car electric source 112 is activated by the charge-or-start device 116.

Furthermore, electric power of the battery unit 118 is provided to the start motor of the on-car electric source 112 through the charge-or-start device 116 for activating the start motor. After the start motor is activated, the start motor drives an internal combustion engine which further drives the engine generator of the on-car electric source 112 to generate power for charging the battery unit 118.

The charge-or-start controller 240 can activate the start motor of the on-car electric source 112. Here, the start motor can be realized by a brushless DC motor or an AC synchronous motor. In start mode, the charge-or-start controller 240 activates the start motor of the on-car electric source 112 by the six-step square wave control.

FIGS. 6A-6F show current flows in activating the start motor of the on-car electric source 112 according to the present embodiment of the disclosure. The required electric power is provided by the battery unit 118 when the start motor of the on-car electric source 112 is activated.

Figure 6A:
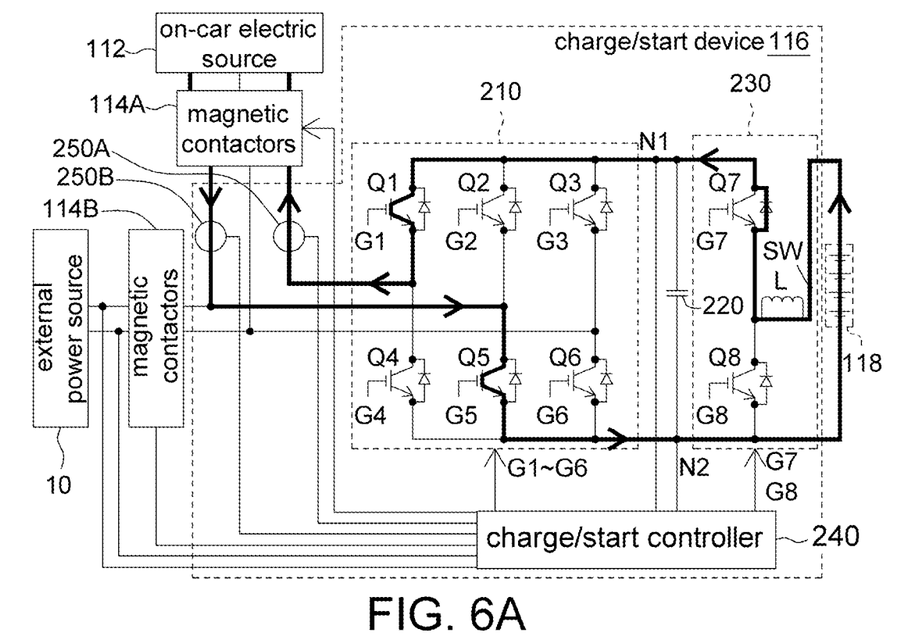
FIGS. 6A~6F are sequentially schematic views of current flows in activating a start motor of the on-car electric source according to the embodiment of the disclosure.

In FIG. 6A, the current flows in the following directions: the battery unit 118→the switch SW→the inductor L→the IGBT Q7 (particularly, the free-wheeling diode of the IGBT Q7)→the IGBT Q1 (particularly, the transistor of the IGBT Q1)→the magnetic contactor 114A→the start motor of the on-car electric source 112→the magnetic contactor 114A→the IGBT Q5 (particularly, the transistor of the IGBT Q5)→the battery unit 118.

Figure 6B:
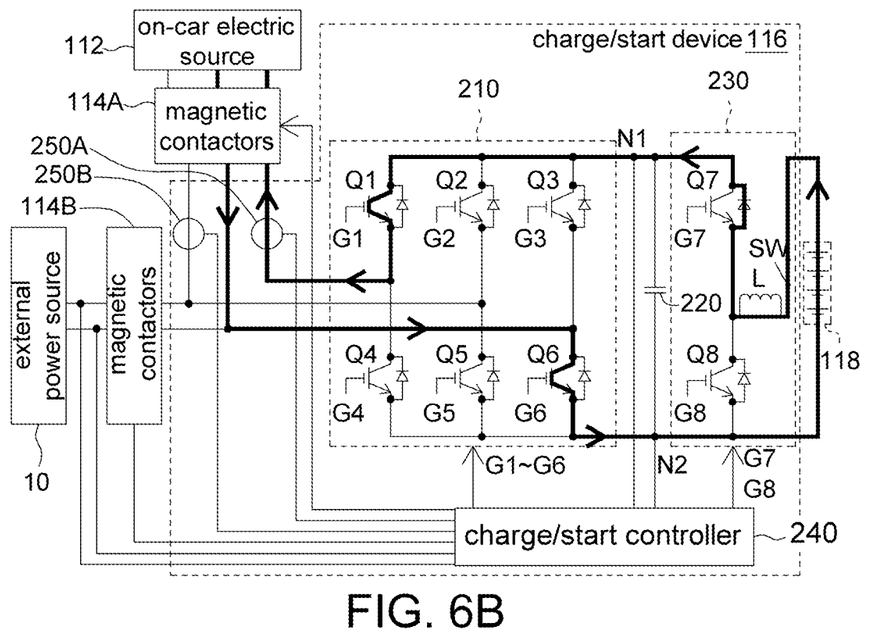

In FIG. 6B, the current flows in the following directions: the battery unit 118→the switch SW→the inductor L→the IGBT Q7 (particularly, the free-wheeling diode of the IGBT Q7)→the IGBT Q1 (particularly, the transistor of the IGBT Q1)→the magnetic contactor 114A→the start motor of the on-car electric source 112→the magnetic contactor 114A→the IGBT Q6 (particularly, the transistor of the IGBT Q6)→the battery unit 118.

Figure 6C:
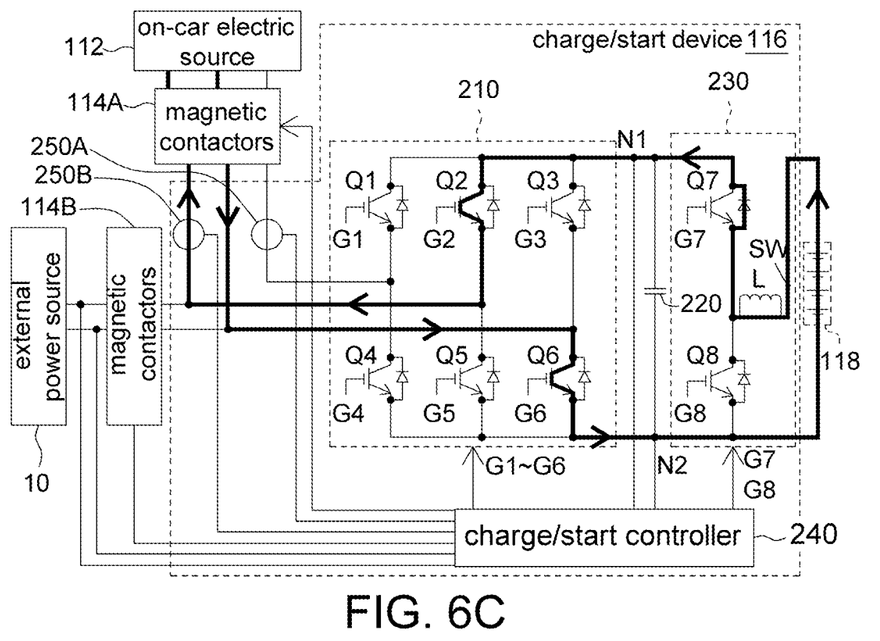

In FIG. 6C, the current flows in the following directions: the battery unit 118→the switch SW→the inductor L→the IGBT Q7 (particularly, the free-wheeling diode of the IGBT Q7)→the IGBT Q2 (particularly, the transistor of the IGBT Q2)→the magnetic contactor 114A→the start motor of the on-car electric source 112→the magnetic contactor 114A→the IGBT Q6 (particularly, the transistor of the IGBT Q6)→the battery unit 118.

Figure 6D:
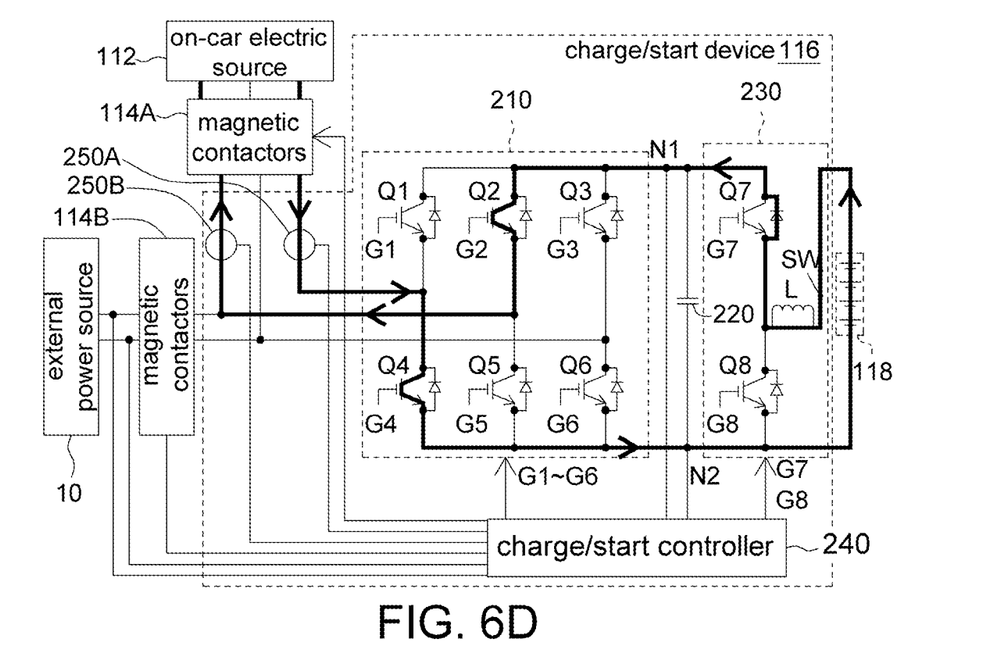

In FIG. 6D, the current flows in the following directions: the battery unit 118→the switch SW→the inductor L→the IGBT Q7 (particularly, the free-wheeling diode of the IGBT Q7)→the IGBT Q2 (particularly, the transistor of the IGBT Q2)→the magnetic contactor 114A→the start motor of the on-car electric source 112→the magnetic contactor 114A→the IGBT Q4 (particularly, the transistor of the IGBT Q4)→the battery unit 118.

Figure 6E:
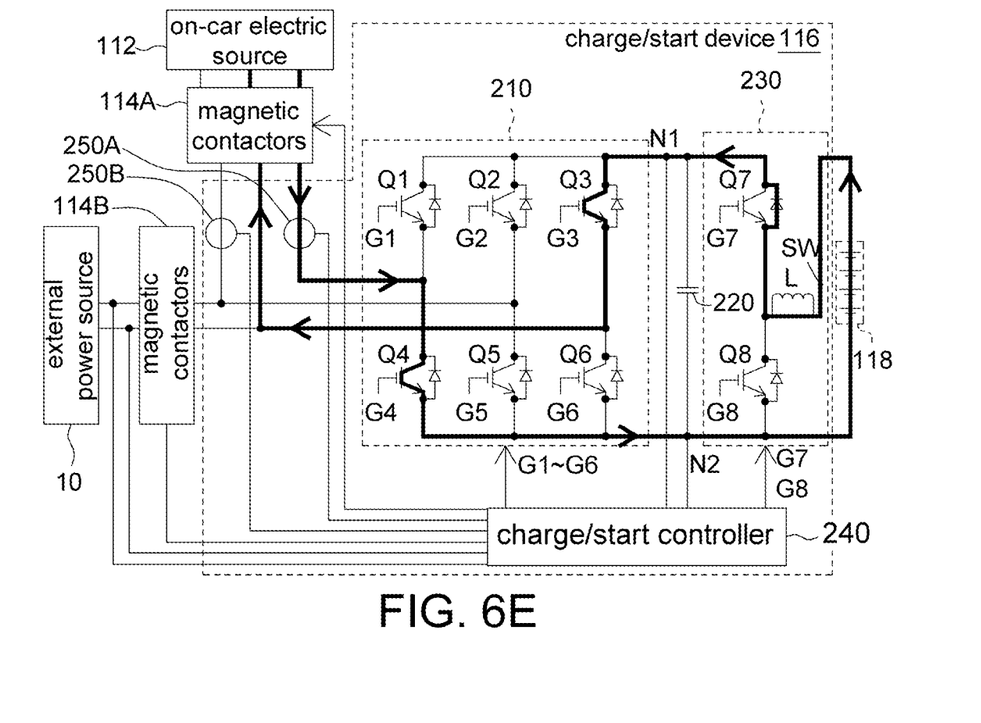

In FIG. 6E, the current flows in the following directions: the battery unit 118→the switch SW→the inductor L→the IGBT Q7 (particularly, the free-wheeling diode of the IGBT Q7)→the IGBT Q3 (particularly, the transistor of the IGBT Q3)→the magnetic contactor 114A→the start motor of the on-car electric source 112→the magnetic contactor 114A→the IGBT Q4 (particularly, the transistor of the IGBT Q4)→the battery unit 118.

Figure 6F:
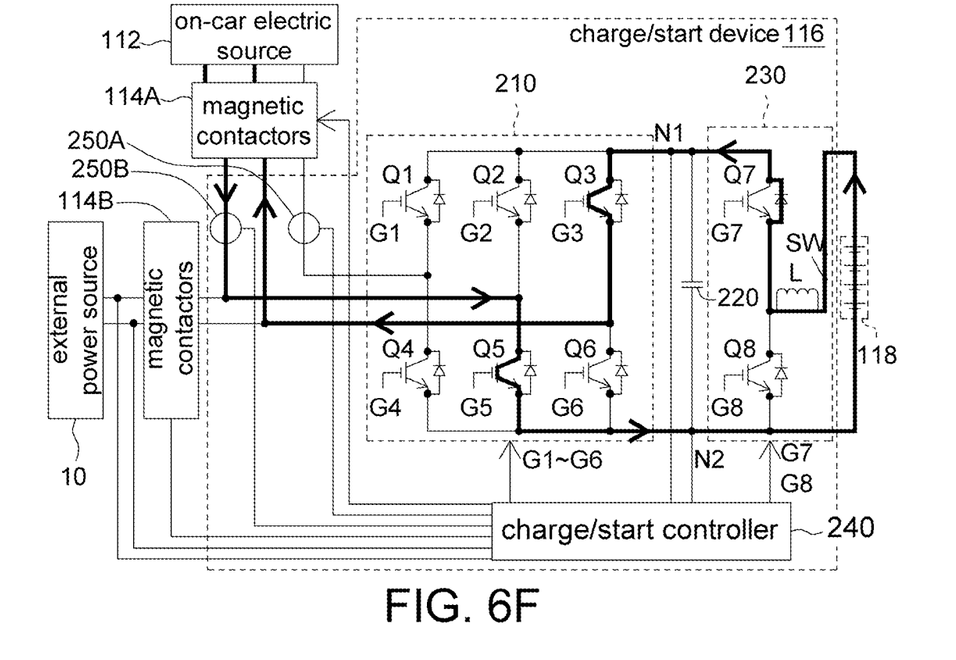

In FIG. 6F, the current flows in the following directions: the battery unit 118→the switch SW→the inductor L→the IGBT Q7 (particularly, the free-wheeling diode of the IGBT Q7)→the IGBT Q3 (particularly, the transistor of the IGBT Q3)→the magnetic contactor 114A→the start motor of the on-car electric source 112→the magnetic contactor 114A→the IGBT Q5 (particularly, the transistor of the IGBT Q5)→the battery unit 118.

As indicated in FIG. 4, FIG. 5 and FIGS. 6A-6F, the current flows between the on-car electric source 112 and the battery unit 118 is referred as the second current flow.

To summarize, the voltage outputted from the on-car electric source 112 has a wide range, and can be used for charging the battery unit 118 through the bi-direction DC-DC converter 230.

The bi-direction DC-DC converter can match with the battery unit and the start motor as well. That is, the power supplied by the on-car electric source or by the external power source can be bucked/boosted through the bi-direction DC-DC converter and is suitable for charging the battery unit (that is, the bi-direction DC-DC converter can be realized by a boost converter or a buck converter). Moreover, through the bi-direction DC-DC converter, the voltage outputted from the battery unit is bucked/boosted and the converted voltage is suitable in driving the start motor of the on-car electric source.

The IGBT module of the present embodiment of the disclosure can receive three-phase AC power, single-phase AC power or DC power. The charge-or-start controller can detect the voltages on the node (N1 and N2) on the DC voltage bus (coupled to the IGBT module) for defining a required operation mode.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A charge-or-start system applied in an electric vehicle, comprising:
    a charge-or-start device coupled to an external power source;
    an on-car electric source coupled to the charge-or-start device;
    a battery unit coupled to the charge-or-start device for storing and providing power;
    a first magnetic contactor controlled by the charge-or-start device for conducting or breaking a first current flow between the external power source and the battery unit;
    a second magnetic contactor controlled by the charge-or-start device for conducting or breaking a second current flow between the on-car electric source and the battery unit;
    an insulated gate bipolar transistor (IGBT) module for receiving and conducting the first and the second current flows;
    a filter coupled to the IGBT module for filtering voltage of the first and the second current flows;
    a bi-direction DC-DC converter for bucking/boosting voltage of the first and the second current flows;
    a charge-or-start controller for detecting an output voltage of the IGBT module and an output voltage of the bi-direction DC-DC converter to control the IGBT module and the bi-direction DC-DC converter for controlling paths of the first current flow and the second current flow; and
    a first and a second current sensor for respectively sensing a current flowing between the second magnetic contactor and the IGBT module;
    wherein:
    in charge mode, under control of the charge-or-start device, one of the external power source and the on-car electric source provides power to the battery unit for charging the battery unit through the charge-or-start device;
    in start mode, under control of the charge-or-start device, the battery unit provides power to the on-car electric source through the charge-or-start device, for activating the on-car electric source.

2. The charge-or-start system according to claim 1, wherein if the charge-or-start controller detects that an output voltage of the battery unit is lower than a predetermined voltage, the charge-or-start controller activates the charge mode.

3. The charge-or-start system according to claim 2, wherein,
    if the charge-or-start controller detects that the external power source is electrically connected to the electric vehicle, the charge-or-start controller performs charge control, so that the battery unit is charged by the external power source;
    the IGBT module converts AC power outputted from the external power source into DC power for charging the battery unit; and
    if a voltage of the external power source is higher than a charge voltage for charging the battery unit, the bi-direction DC-DC converter performs a buck conversion.

4. The charge-or-start system according to claim 2, wherein the on-car electric source comprises a fuel cell, and
    in charge mode, under control of the charge-or-start device, the fuel cell provides power to the battery unit for charging the battery unit through the charge-or-start device.

5. The charge-or-start system according to claim 2, wherein the on-car electric source comprises a start motor and an internal combustion engine generator, and
    in charge mode, under control of the charge-or-start device, electric power generated by the internal combustion engine generator is outputted to the battery unit through the charge-or-start device for charging the battery unit, and the IGBT module rectifies AC power outputted by the internal combustion engine generator into DC power.

6. The charge-or-start system according to claim 5, wherein,
    in start mode, under control of the charge-or-start device, the battery unit provides power to the on-car electric source through the charge-or-start device for activating the start motor of the on-car electric source.

7. The charge-or-start system according to claim 6, wherein the internal combustion engine generator is a rotation engine generator or a linear engine generator.

8. The charge-or-start system according to claim 1, wherein the battery unit further has a battery management system coupled to the charge-or-start device for performing charge control.

9. The charge-or-start system according to claim 1, wherein the bi-direction DC-DC converter is a buck converter or a boost converter.

10. An electric vehicle, comprising:
    a charge-or-start system; and
    a motor, the charge-or-start system providing power to the motor;
    wherein the charge-or-start system comprises:
    a charge-or-start device coupled to an external power source;
    an on-car electric source coupled to the charge-or-start device;
    a battery unit coupled to the charge-or-start device for storing and providing power;
    a first magnetic contactor controlled by the charge-or-start device for conducting or breaking a first current flow between the external power source and the battery unit;
    a second magnetic contactor controlled by the charge-or-start device for conducting or breaking a second current flow between the on-car electric source and the battery unit;
    an insulated gate bipolar transistor (IGBT) module for receiving and conducting the first and the second current flows;
    a filter coupled to the IGBT module for filtering voltage of the first and the second current flows;
    a bi-direction DC-DC converter for bucking/boosting voltage of the first and the second current flows;
    a charge-or-start controller for detecting an output voltage of the IGBT module and an output voltage of the bi-direction DC-DC converter to control the IGBT module and the bi-direction DC-DC converter for controlling paths of the first and the second current flows; and a first and a second current sensor for respectively sensing a current flowing between the second magnetic contactor and the IGBT module;

wherein:

in charge mode, under control of the charge-or-start device, one of the external power source and the on-car electric source provides power to the battery unit for charging the battery unit through the charge-or-start device;

in start mode, under control of the charge-or-start device, the battery unit provides power to the on-car electric source through the charge-or-start device, for activating the on-car electric source.

11. The electric vehicle according to claim 10, wherein if the charge-or-start controller detects that an output voltage of the battery unit is lower than a predetermined voltage, the charge-or-start controller activates the charge mode.

12. The electric vehicle according to claim 11, wherein, if the charge-or-start controller detects that the external power source is electrically connected to the electric vehicle, the charge-or-start controller performs charge control, so that the battery unit is charged by the external power source;

the IGBT module converts AC power outputted from the external power source into DC power for charging the battery unit; and if voltage of the external power source is higher than a charge voltage for charging the battery unit, the bi-direction DC-DC converter performs a buck conversion.

13. The electric vehicle according to claim 11, wherein the on-car electric source comprises a fuel cell, in charge mode, under the control of the charge-or-start device, the fuel cell provides power to the battery unit for charging the battery unit through the charge-or-start device.

14. The electric vehicle according to claim 11, wherein the on-car electric source comprises a start motor and an internal combustion engine generator, and in charge mode, under control of the charge-or-start device, electric power generated by the internal combustion engine generator is outputted to the battery unit through the charge-or-start device for charging the battery unit, and the IGBT module rectifies AC power outputted by the internal combustion engine generator into DC power.

15. The electric vehicle according to claim 14, wherein, in start mode, under control of the charge-or-start device, the battery unit provides power to the on-car electric source through the charge-or-start device for activating the start motor of the on-car electric source.

16. The electric vehicle according to claim 15, wherein the internal combustion engine generator is a rotation engine generator or a linear engine generator.

17. The electric vehicle according to claim 10, wherein the battery unit further has a battery management system coupled to the charge-or-start device for performing charge control.

18. The electric vehicle according to claim 10, wherein the bi-direction DC-DC converter is a buck converter or a boost converter.

* * * * *